United States Patent [19]

Smirra

[11] 4,376,885
[45] Mar. 15, 1983

[54] PROCESS AND APPARATUS FOR PRODUCING A RING UNIT FOR THE VALVE PARTS OF LABYRINTH VALVES

[76] Inventor: Johannes R. Smirra, Wunderlichstr. 2, 8000 München 60, Fed. Rep. of Germany

[21] Appl. No.: 216,653

[22] Filed: Dec. 15, 1980

[30] Foreign Application Priority Data

Dec. 17, 1979 [DE] Fed. Rep. of Germany ....... 2950778

[51] Int. Cl.³ .............................................. B23K 15/00
[52] U.S. Cl. ........................ 219/121 EC; 29/157.1 R; 137/243; 219/121 ED; 219/121 EX; 228/131; 228/182; 251/359; 269/47; 269/49; 269/246; 269/268; 269/287
[58] Field of Search ................. 219/121 EC, 121 ED, 219/121 EX, 121 LC, 121 LD, 121 LY, 158; 29/157.1 R; 228/131, 182, 184; 269/47, 49, 246, 268, 287; 251/356, 359; 137/243

[56] References Cited

U.S. PATENT DOCUMENTS

| | | | |
|---|---|---|---|
| 2,890,042 | 6/1959 | Clemensen | 269/49 X |
| 3,000,083 | 9/1961 | Bryant | 29/157.1 R |
| 3,185,438 | 5/1965 | Smirra | 251/334 |
| 3,949,186 | 4/1976 | Nakayama et al. | 219/121 ED |
| 3,958,739 | 5/1976 | Wicker et al. | 219/121 EC X |

FOREIGN PATENT DOCUMENTS 2008765 9/1971 Fed. Rep. of Germany.

Primary Examiner—C. L. Albritton
Attorney, Agent, or Firm—Nims, Howes, Collison & Isner

[57] ABSTRACT

For producing the seat or valve member of a labyrinth valve a number of rings of different diameter are placed one inside the other as a workpiece with their blade-like edges turned in the same direction. The group of rings is then slipped over the middle guide or stem of a jig so that the downwardly turned blade-like edges on the rings come to rest against upwardly directed ring-like blades on the jig. These blades are designed with a form answering to the form of the other valve part with which the workpiece is to be used. The rings in the workpiece are pressed down against the blades for leveling them and are then welded together, for example by electron beam welding.

9 Claims, 3 Drawing Figures

PROCESS AND APPARATUS FOR PRODUCING A RING UNIT FOR THE VALVE PARTS OF LABYRINTH VALVES

BACKGROUND OF THE INVENTION (i) Field to which the Invention Relates

The present invention is with respect to a process and apparatus for producing a valve part, such as a valve seat or valve moving member, for a cone labyrinth valve.

(ii) The Prior Art

Designs for cone labyrinth valves had been put forward in U.S. Pat. No. 3,185,438 and German Pat. No. 2,008,765. The valve parts, that is to say the valve moving member and the valve seat, of such a labyrinth valve are each made with at least two blade-like edges in the form of annular cones, such that on the valve member being moved towards the valve seat the blade-like edges are responsible for producing a complexly folded or labyrinth-like path for the fluid to be rate-controlled and/or shut down. The fluid may for example be a liquified gas, melted metal, suspensions of solids and the like. When the valve is shut, it is cleaned at the same time, because any grain or hair-like materials in the fluid, for example in a liquid, are cut off and scraped from the valve member and valve seat and for this reason cleared from the system or cut down in size and will furthermore be cleared from the valve between the valve member and the valve seat later on. The form of the blade-like edges on the valve member and the valve seat may be the same in the two cases (see U.S. Pat. No. 3,185,438) or different (see German Pat. No. 2,008,765); furthermore the properties of the materials used for making the valve member and the valve seat may be different. Because of the different form and/or different material of the valve parts, the meshing and rate-controlling properties of the edges on the valve member and valve seat may be changed so that the best valve properties are produced in any given case of use.

The valve member and valve seat of such a cone labyrinth valve may be produced in a number of different ways, for example by pressure casting, in a powder metallurgical process, by extruding etc. with later machining for truing up the edges. As a general rule however, the valve member or the valve seat is machined from solid material on a lathe and then after-processed in a special spinning and polishing operation to get an accurate size. Because the depth of the valleys between one edge and the next one on the valve member and on the valve seat are relatively great in size, and because narrow spaces between the edges or ring cones may only be machined with very thin lathe cutting tools, producing such valve members and valve seats is generally a very complex operation. Furthermore the sizes and spacings of the different parts of such a valve member and more specially with respect to conicity, the depth of the cutting edges and the spacing therebetween have to be kept within tight tolerances, although once the valve member and valve seat are put into operation and the valve shut, there will be a self-truing or positioning effect. Even so however such prior art processes are generally complex and high in price.

Furthermore machining and processing have to be so exact that on shutting the labyrinth valve the valve member and the valve seat are such that their edges are run up against each other at more or less the same time or with a cutting effect, that is to say the "drawing cut" takes place on shutting down the valve (see German Pat. No. 2,008,765, column 4, starting at line 51).

A suggestion has been made for the valve plate and the valve seat of such cone labyrinth valves to have their edges on separate rings. Although in this case the edges of the valve bodies no longer have to be turned from solid material, it has turned out to be hard to get the rings with the edges exactly into the right position and leveled up in relation to each other that the properties noted or tolerances are kept to on shutting down the valve. More specially in the case of small sizes of valve members very exact measuring instruments have been necessary and in fact in some cases later machining and truing up of the edges has been necessary for producing the right cone angle and depth of edge.

OUTLINE OF THE INVENTION

One purpose of the present invention is that of designing a process and an apparatus for making the processing of valve members of cone labyrinth valves simpler.

A further purpose of the invention is to make it possible for the sizes of the valve member and more specially the sizes and positioning in relation to each other of the edges of the valve member to be very exactly kept to.

A further purpose is that of making possible such exact machining and processing without complex and high-price measuring operations.

A still further purpose of the present invention is that of producing valve members in a single operation, that is to say, putting it differently, without any later machining or truing operations.

Lastly, one purpose of the invention is that of designing such a system in which valve parts may be produced at a low price.

In the invention a valve part, that is to say the valve moving member or the valve seat, of a cone labyrinth valve is made up of a number of concentric rings resting against each other, which have an edged form and whose face has been processed in some desired way. The rings with the blade-like edges are positioned in relation to each other using a jig, which for its part has jig blades, answering in form to the valve part with which the ring unit is to be used, the jig blades being directed towards the blade-like edges of the rings when they are placed thereon. The jig blades of the jig have support or stop edges to make certain that the blade-like edges of the rings resting against them are so positioned that such edges will make desired point or edge contact with the edges of the opposite valve part, that is to say the valve member or the valve seat, with which the ring unit is to be used. In this way no measuring of the positions of the blade-like edges of the valve part, for seeing that they are in the right positions, will be necessary and furthermore no later truing up of the edges will be necessary, because the rings are lined up and kept in position on the jig body with the right height of the edges and at given diameters. Nextly the rings, after being tacked together if necessary, are joined together permanently, for example by brazing, diffusion arcatom welding, electron beam welding or laser beam welding. In the case of brazing and diffusion welding welds over a wide area are produced on the pipe-like parts of the rings, whereas in the case of the arcatom process and laser beam welding the top end faces, opposite to the blade-like edges are joined together. It is however best in the present invention for the rings to be radially electron beam welded, that is to say in a direction normal to their axis so that the complete workpiece, made up of the separate rings has the welds going through it in a radial direction after electron beam welding, the material of the rings being melted and joined up at the weldments.

Such a ring unit is then joined to an other part or parts to take the form of a valve moving member or a valve seat which may then be used in a labyrinth valve.

LIST OF FIGURES

Further developments and useful effects produced by the invention will be seen from the dependent claims and the account now to be given of a working example to be seen in the figures.

DETAILED ACCOUNT OF WORKING EXAMPLE OF THE INVENTION

Figure 1:
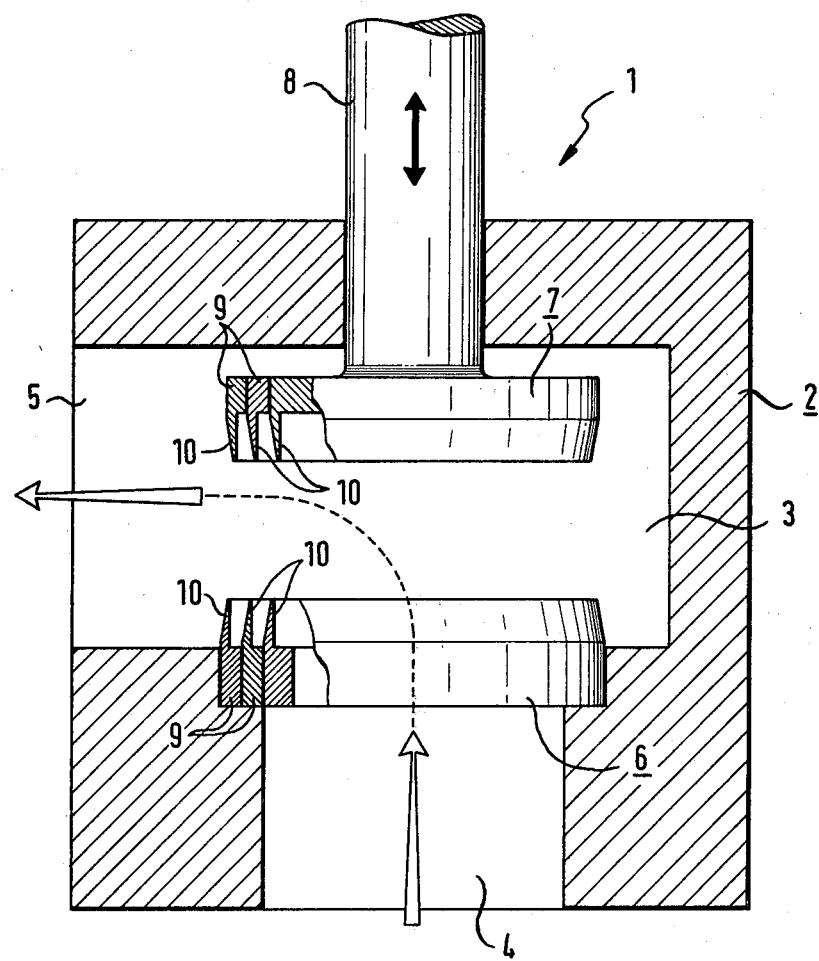
FIG. 1 is a diagrammatic partly cutaway view of a cone labyrinth valve, whose valve member and valve seat are made up of rings as part of the present invention.

The cone labyrinth valve 1 has a valve housing 2 with a valve space 3 together with an inlet 4 and an outlet 5. In valve space 3 near the mouth of the inlet and round the same there is a valve seat 6 while opposite to the valve seat there is a valve member 7, which may be moved towards the valve seat and against it using a valve driving rod 8 for the purpose of shutting off inlet 4 from outlet 5.

The valve seat and the valve member each have a number of concentric rings 9 resting against each other, which have blade-like edges 10. The rings are made up of a metal with the right properties while the form of the blade-like edges will be different and be dependent on the purpose of the valve (see German Pat. No. 2,008,765).

Rings 9 of the valve part, that is to say the valve member or the valve seat, are produced from separate pieces of pipe or tube, the blade-like edges being milled on a lathe. After this the blade-like edges of the rings are processed on their outer faces, for example by electroplating, hardening and polishing.

Figure 2:
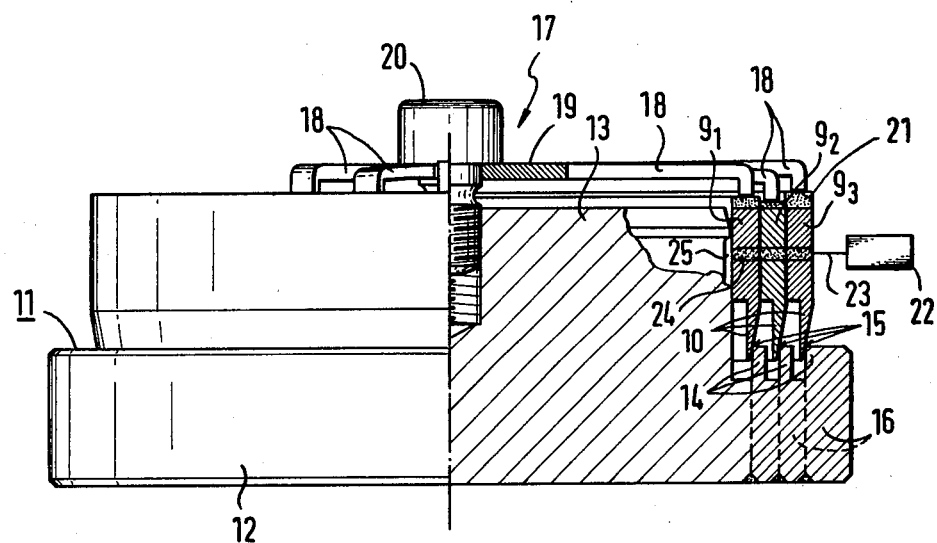
FIG. 2 is a further partly sectioned view of a ring unit (designed for use as a valve member) on a jig body.
Figure 3:
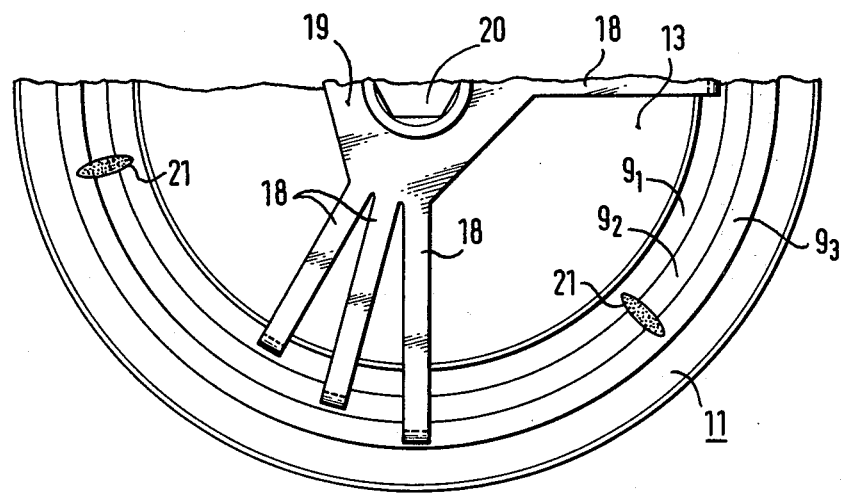
FIG. 3 is a plan view of the parts to be seen in FIG. 2.

In the case of the cone labyrinth valve 1 to be seen in FIG. 1 the valve seat 6 and the valve moving member 7 are in each case made up of a three ring unit, the rings of each valve part 6 and 7 having the same blade-like edge form, this form being given in FIG. 2 in the case of the valve member as well. However this observation is not to be taken in a limiting sense and different forms of blade-like edge are in fact possible.

For putting together the rings in the ring unit they are placed on a jig body 11, which has a base 12 and a middle stem 13 on it. The outer diameter of middle stem 13 is equal to the inner diameter of the smallest ring $9_1$ of the valve member to be seen in FIG. 2 so that the middle stem 13 will be touching the inner face of ring $9_1$ when it is slipped on to jig body 11. A middle ring $9_2$ is slipped onto ring $9_1$ and on it the outer ring $9_3$ is placed.

On the top side of base 12 of jig body 11 ring-like jig blades 14 are to be seen which have guide or stop edges 15. Jig blades 14 are placed so as to be pointing in the opposite direction to the blade-like edges 10 of rings 9. Jig blades 14 have a rectangular cross-section and are produced by milling base 12 of the jig body or they may in each case be part of a jig or reference ring 16 of the jig body, this being marked in broken lines in FIG. 2. In this last-named case the jig blades 16 are produced generally on the same lines as the rings 9 of the valve member or seat and welded to the jig body.

The position of the guide or stop edges 15 of jig plates 14 of jig body is very exact and is such that the points are touching between the blade-like edges of the valve member rings along the edges 15 is such as to be answering to the points of touching between the blade-like edges of the valve member and those of the valve seat on shutting down the valve.

Once the rings $9_1$, $9_2$ and $9_3$ have been placed on jig body 11 they are weighted by a force-producing unit 17 so that their blade-like edges 10 are forced against the stop or guide edges 15 of jig blades 14. The force-producing unit 17 has a number of spring steel fingers 18 running out from a common middle plate 19, which is placed on the top of middle stem 13 and forced against it by screwing up a fixing screw 20. Each spring steel finger 18 has its outer end bent downwards, the bent down end resting against the ring 9 in question. For each ring there are three (for example) spring steel fingers. Without being dependent on the heights of the rings 9, which by way of the blade-like edges 10 are produced, the rings are forced down by spring steel fingers 18 with the same force lightly, so that their blade-like edges 10 are forced and kept against the jig blades 14.

The rings 9 are joined together at their top face by a number of spot welds 21. It is only after this has been done that they are permanently welded together with an electron beam welding apparatus 22 producing an electron beam 23 directed to a point generally in the middle of the cylindrical outer faces of the rings and producing a welding effect right the way through the rings. The rings are joined together at a number of points by radial penetrating weld seams 24 running through them. It would furthermore be possible to have a radial weld seam running right the way round the rings. At the same height as the radial seam 24 the outer face of middle stem 13 is let back somewhat at 25 to make certain that it is not welded to the rings.

After the welding operation the ring unit, made up of the three rings $9_1$, $9_2$ and $9_3$ may be taken from the jig body and placed in a valve, grinding of the top face of the rings being possible if necessary before doing this. The trued up ring unit as taken from the jig body is then joined to the valve member driving rod 8 for use as a part of the valve member.

The valve seat 6 will be produced on the same lines using rings and the placed inside the valve.

The valve part may be very simply produced in the present invention, it simply being necessary for single, separately produced rings to be put together, which each have a blade-like edge and have the desired surface properties. For positioning the rings in relation to each other only one jig body is necessary, by which the rings may be placed in the right position by adjustment so that the positions of the separate blade-like edges do not have to be tested by a measuring operation. Furthermore the position of the rings may go into on the jig body is not in any way changed by the electron beam welding operation, because no high temperature gradients are produced thereby, which might otherwise be responsible for twisting and loss of form of the rings.

I claim:

1. In a process for making a ring unit for a cone labyrinth valve, said ring unit having at least two rings of which each has a blade-like edge, and being designed for use with a like ring unit in said valve for control of fluid motion by decreasing the distance between said units towards each other so that at least one blade-like edge of one said unit is between two ones of said edges on the other said unit causing fluid motion along a complexly folded path, the invention residing in the working steps of:

firstly producing blade-like edges on rings with cylindrical faces, making up a workpiece by placing such rings together one inside the other with an outer face of at least one ring touching the inner face of an other ring placed round it; moving said workpiece towards a jig with ring-like blades answering to the form of said ring unit with which the rings in said workpiece are to be used in said valve so that said rings in said workpiece are in a position in relation to each other representative of their condition in use in said valve; and fixing said rings in said workpiece in relation to each other.

2. The process as claimed in claim 1 wherein said rings in said workpiece are welded together.

3. The process as claimed in claim 1 wherein said rings in said workpiece are welded together by electron beam welding.

4. An apparatus for producing a ring unit for a labyrinth valve, said unit being made up of at least two rings of which each has a blade-like edge, said ring unit being designed for use with a like ring unit in said valve for control of fluid motion by decreasing the distance between said unit towards each other so that at least one blade-like edge of one said unit is between two ones of said edges on the other said unit causing fluid motion along a complexly folded path, the invention residing in that the apparatus has a jig body with at least two ring-like blades answering to the form of the blade-like edges in said valve, said blades of said jig having stop edges for acting against said rings of said ring unit which is to be made, a force producing system for keeping and pushing said rings in said units against said edges on said blades on said jig unit, and a welder for welding said rings together after being put in line with each other by said blades of said jig body.

5. An apparatus as claimed in claim 4 wherein the welder is an electron beam welder designed for welding together the rings, after being positioned in relation to each other on said jig body, in a radial direction.

6. An apparatus as claimed in claim 4 having a middle stem on said jig body, said stem having a diameter equal to the inner diameter of an innermost ring in said ring unit, and a force producing system for keeping in position and pushing said rings against said jig blades of said jig body.

7. An apparatus as claimed in claim 4 having spring steel fingers for pushing said rings of said ring unit against said jig blades of said jig body.

8. An apparatus as claimed in claim 4 in which the jig body, at least near the jig blades, is made up of concentric jig rings, each having one of said jig blades on it.

9. An apparatus as claimed in claim 4 wherein at their stop edges the jig blades have a rectangular cross-section.

* * * * *